United States Patent
Nomamoto et al.

(10) Patent No.: US 10,395,400 B2
(45) Date of Patent: Aug. 27, 2019

(54) DISPLAY METHOD OF INFORMATION INDICATING AN OPERATING STATUS OF A MANUFACTURING SYSTEM

(71) Applicant: FUJITSU LIMITED, Kawasaki-shi, Kanagawa (JP)

(72) Inventors: Satoshi Nomamoto, Yokohama (JP); Takehiko Nishimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/987,353

(22) Filed: May 23, 2018

(65) Prior Publication Data
US 2018/0268580 A1    Sep. 20, 2018

Related U.S. Application Data

(63) Continuation of application No. PCT/JP2015/084583, filed on Dec. 9, 2015.

(51) Int. Cl.
*G06F 3/147* (2006.01)
*G06Q 50/04* (2012.01)
(Continued)

(52) U.S. Cl.
CPC .......... *G06T 11/206* (2013.01); *G05B 19/409* (2013.01); *G05B 19/418* (2013.01);
(Continued)

(58) Field of Classification Search
None
See application file for complete search history.

(56) References Cited

U.S. PATENT DOCUMENTS 5,479,343 A * 12/1995 Matoba .................. G06Q 10/06
                                                    700/106
5,793,638 A *  8/1998 Yao ....................... B23P 21/004
                                                    700/226
(Continued)

FOREIGN PATENT DOCUMENTS

EP      2 849 069 A1    3/2015
GB      2 353 616 A     2/2001
(Continued)

OTHER PUBLICATIONS

Extended European Search Report dated Dec. 20, 2018 in corresponding European Patent Application No. 15910235.9.
(Continued)

*Primary Examiner* — Jason A Pringle-Parker
(74) *Attorney, Agent, or Firm* — Staas & Halsey LLP

(57) ABSTRACT

A display method includes: displaying, in a first screen area, a line segment indicating a passage of time from start to end of a manufacturing process in each of process, with time axes being aligned in a same direction between the processes, in a state being segmented for each process in order of execution of the process, for each of one or more products manufactured by a manufacturing system; and displaying, in a second screen area, a graph indicating a passage of time from start to end of a manufacturing process, with time axes being aligned in a same direction as time axes in the first screen area, based on information of a start time and an end time of a manufacturing process in one or more manufacturing facilities included in a selected first process among the processes, for each of the manufacturing facilities in the first process.

8 Claims, 8 Drawing Sheets

(51) Int. Cl.
 *G06T 11/20* (2006.01)
 *G05B 19/409* (2006.01)
 *G05B 19/418* (2006.01)
 *G06F 3/0482* (2013.01)

(52) U.S. Cl.
 CPC ..... *G05B 19/41865* (2013.01); *G06F 3/0482* (2013.01); *G06F 3/147* (2013.01); *G06Q 50/04* (2013.01); *G05B 2219/31472* (2013.01); *G05B 2219/31478* (2013.01); *G06F 2203/04803* (2013.01); *Y02P 90/02* (2015.11); *Y02P 90/18* (2015.11); *Y02P 90/20* (2015.11); *Y02P 90/30* (2015.11)

(56) References Cited

U.S. PATENT DOCUMENTS

| | | | | |
|---|---|---|---|---|
| 7,016,764 | B2* | 3/2006 | Penkar | G06Q 10/08 700/214 |
| 7,764,191 | B2* | 7/2010 | Hall | G05B 19/042 340/12.51 |
| 2005/0216111 | A1* | 9/2005 | Ooshima | G06Q 10/06 700/99 |
| 2007/0057789 | A1* | 3/2007 | Hamerly | G06Q 10/06 340/572.1 |
| 2009/0024239 | A1 | 1/2009 | Yoshioka et al. | |
| 2009/0048704 | A1* | 2/2009 | Redford | B07C 3/00 700/224 |
| 2013/0233922 | A1* | 9/2013 | Schoening | G06Q 10/087 235/385 |
| 2013/0346138 | A1* | 12/2013 | Rai | G06Q 10/06 705/7.24 |
| 2015/0097840 | A1 | 4/2015 | Nishimura et al. | |
| 2016/0085734 | A1* | 3/2016 | Piccazzo | G06F 17/2247 715/234 |

FOREIGN PATENT DOCUMENTS

| | | |
|---|---|---|
| JP | 2003-186517 | 7/2003 |
| JP | 2006-302096 | 11/2006 |
| JP | 2009-25851 | 2/2009 |
| JP | 2009-187266 | 8/2009 |
| JP | 2010-3228 | 1/2010 |
| JP | 2010-40007 | 2/2010 |
| JP | 2012-22602 | 2/2012 |
| JP | 2015-75795 | 4/2015 |

OTHER PUBLICATIONS

International Search Report dated Mar. 1, 2016 in corresponding International Patent Application No. PCT/JP2015/084583.
Written Opinion of the International Searching Authority dated Mar. 1, 2016 in corresponding International Patent Application No. PCT/JP2015/084583.

* cited by examiner

DISPLAY METHOD OF INFORMATION INDICATING AN OPERATING STATUS OF A MANUFACTURING SYSTEM

CROSS-REFERENCE TO RELATED APPLICATION

This application is a continuation application of International Application PCT/JP2015/084583, filed on Dec. 9, 2015, and designating the U.S., the entire contents of which are incorporated herein by reference.

FIELD

The present invention relates to a display method, a display program, and a display control device.

BACKGROUND

Along with the popularization of IoT (Internet of Things), a large amount of data is generated on a daily basis by various types of devices in the manufacturing field, and a next-generation approach to manufacturing using such a large amount of data is under way.

For example, there has been proposed a technique of using log data collected from respective processes of a manufacturing line for visualization of production performance. Such visualization of production performance can be realized, as an example, by a display of a timeline obtained by making a line graph as a chart in which a start time or an end time of a manufacturing process corresponding to each process is plotted for individual bodies flowing in a manufacturing line, where a time is indicated by a vertical axis and a process is indicated by a horizontal axis.

Patent Document 1: Japanese Patent Application Laid-open No. 2009-25851

Patent Document 2: Japanese Patent Application Laid-open No. 2003-186517

However, according to the technique described above, as explained below, there is a case where it is difficult to visualize influences of the operating status of a manufacturing facility on productivity.

That is, the manufacturing facility arranged in each of the respective processes is not always one facility in one process, and a plurality of manufacturing facilities may be included in one process. In this manner, when a plurality of manufacturing facilities are included in one process, the operating status becomes different according to the manufacturing facilities. Nevertheless, in the timeline descried above, an amount of time required in the manufacturing process corresponding to the corresponding process is only charted in a state where a plurality of manufacturing facilities are grouped in one segment as a process. Therefore, it is difficult to visualize influences of the operating status of a manufacturing facility on productivity from the timeline described above.

SUMMARY

According to an aspect of the embodiments, a display method of information indicating an operating status of a manufacturing system that includes a plurality of processes to be performed sequentially to manufacture one product and includes one or more manufacturing facilities that perform a manufacturing process in each of the processes, the display method includes: displaying, in a first screen area, a line segment indicating a passage of time from start to end of a manufacturing process in each of the processes, with time axes being aligned in a same direction between the processes, based on information of a start time and an end time of a manufacturing process for one product in each of the processes, in a state being segmented for each process in order of execution of the process, for each of one or more products manufactured by the manufacturing system, by a processor; and displaying, in a second screen area, a graph indicating a passage of time from start to end of a manufacturing process, with time axes being aligned in a same direction as time axes in the first screen area, based on information of a start time and an end time of a manufacturing process in one or more manufacturing facilities included in a selected first process among the processes, for each of the manufacturing facilities in the first process, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A display method, a display program, and a display control device according to the present application will be described below in detail with reference to the accompanying drawings. The disclosed technique is not limited to these embodiments. The respective embodiments can be combined with each other within a scope where no contradictions occur in the processing contents.

First Embodiment

[Log-Data Analysis System]

Figure 1:
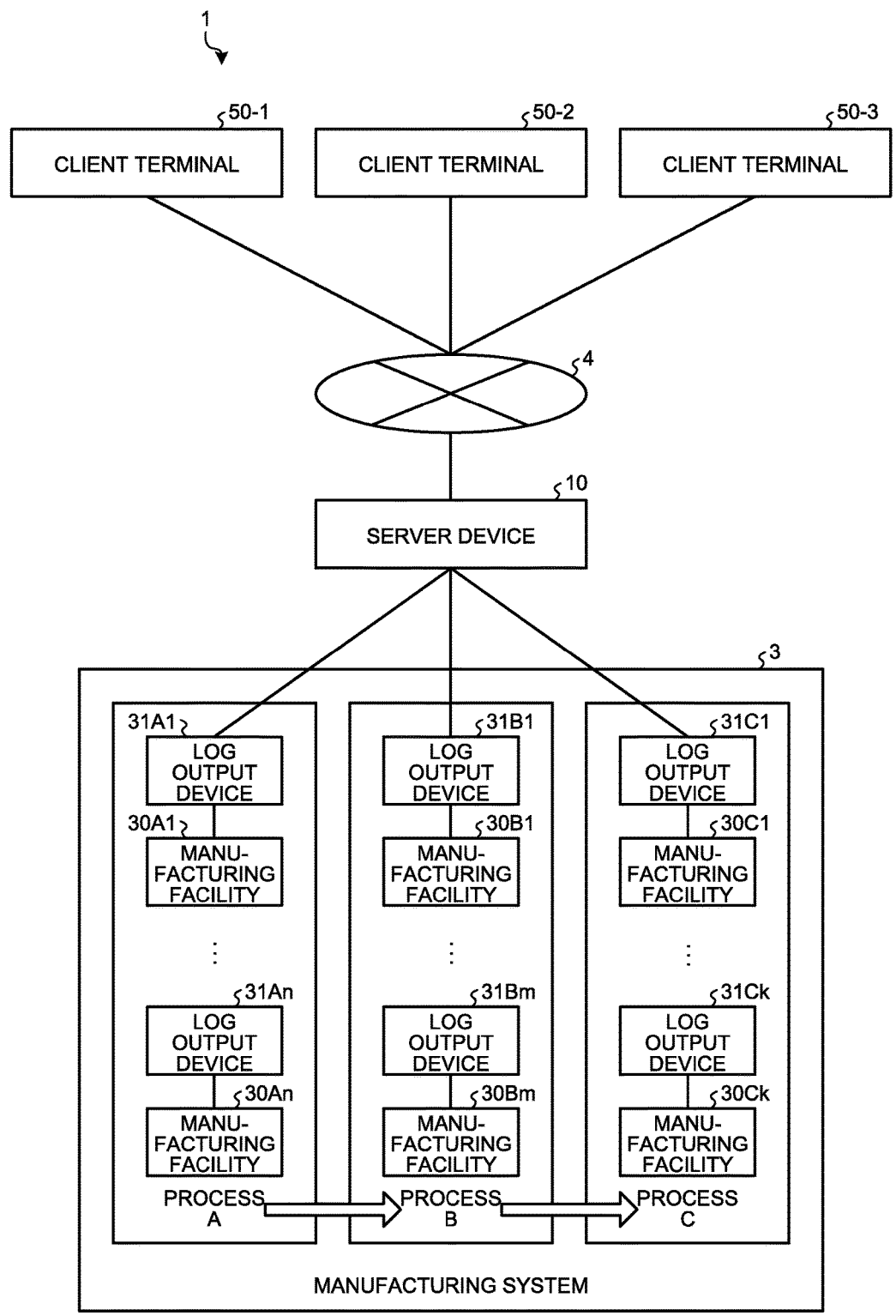
FIG. 1 is a diagram illustrating a configuration of a log-data analysis system according to a first embodiment.

FIG. 1 is a diagram illustrating a configuration of a log-data analysis system according to a first embodiment. A log-data analysis system 1 illustrated in FIG. 1 provides a log-data analysis service that analyzes log data collected from respective processes A to C of a manufacturing system 3. As a function of the log-data analysis system 1, the log-data analysis system 1 realizes visualization of production performance in the manufacturing system 3.

As illustrated in FIG. 1, the log-data analysis system 1 includes a server device 10 and client terminals 50-1 to 50-3. In the following descriptions, when the respective client terminals 50-1 to 50-3 are collectively referred to, these elements may be described as "client terminal 50". In FIG. 1, a case where three client terminals 50 are accommodated in the server device 10 is exemplified. However, the server device 10 is not limited to the illustrated example, and an arbitrary number of client terminals 50 can be accommodated in the server device 10.

The server device 10 is a computer that provides the log-data analysis service described above to the client terminal 50.

As one embodiment, the server device 10 can be implemented by installing a monitoring program that realizes the log-data analysis service described above as package software or online software into a desired computer. For example, the server device 10 can be implemented as a Web server that provides the log-data analysis service described above or can be implemented as a cloud that provides the log-data analysis service described above by outsourcing.

The client terminal 50 is a computer that receives the log-data analysis service described above from the server device 10. The client terminal 50 can be used, as an example, by the relevant persons involved in the manufacturing system 3 including field workers and administrators of the manufacturing system 3.

As one embodiment, a personal computer can be employed as the client terminal 50. The client terminal 50 is not limited to a stationary information processing device such as the personal computer, and various types of mobile terminal devices can be employed as the client terminal 50. The "mobile terminal devices" referred to herein include mobile communication terminals such as a smartphone, a mobile phone, and a PHS (Personal Handyphone System), and a slate terminal and a tablet terminal in its category.

The server device 10 and the client terminal 50 are connected to each other via a network 4. As the network 4, as an example, an arbitrary type of communication network including the Internet, a LAN, and a VPN (Virtual Private Network) can be employed regardless of being wired or wireless.

Meanwhile, in the manufacturing system 3, as illustrated in FIG. 1, a manufacturing line including three processes of a process A, a process B, and a process C is established. In such a manufacturing line, at least one manufacturing facility that performs a manufacturing process corresponding to each process is provided, and the number of manufacturing facilities provided in one process is not always limited to one, and a plurality of manufacturing facilities may be provided in one process according to the design of the manufacturing line. FIG. 1 illustrates a case where the processes included in the manufacturing line are three, which are the processes A to C. However, this is only an example, and an arbitrary number of processes can be provided.

For example, the manufacturing process corresponding to the process A is performed by n manufacturing facilities 30A1 to 30An. It is assumed here that "n" included in the reference sign indicates an arbitrary natural number equal to or larger than 1. These manufacturing facilities 30A1 to 30An are connected to log output devices 31A1 to 31An that output log data of the manufacturing process. Further, the log output devices 31A1 to 31An are connected to the server device 10. In the following descriptions, when the manufacturing facilities 30A1 to 30An are collectively referred to, they may be described as "manufacturing facility 30A", and when the log output devices 31A1 to 31An are collectively referred to, they may be described as "log output device 31A".

Similarly, the manufacturing process corresponding to the process B is performed by m manufacturing facilities 30B1 to 30Bm, and the manufacturing process corresponding to the process C is performed by k manufacturing facilities 30C1 to 30Ck. All the "n", "m", and "k" can be the same natural number, a part of them can be the same natural number, or all of them can be different natural numbers. While the manufacturing facilities 30B1 to 30Bm are connected to the log output devices 31B1 to 31Bm, the manufacturing facilities 30C1 to 30Ck are connected to the log output devices 31C1 to 31Ck. Further, the log output devices 31B1 to 31Bm and 31C1 to 31Ck are connected to the server device 10.

In the following descriptions, when the manufacturing facilities 30B1 to 30Bm are collectively referred to, they may be described as "manufacturing facility 30B", and when the log output devices 31B1 to 31Bm are collectively referred to, they may be described as "log output device 31B". Further, when the manufacturing facilities 30C1 to 30Ck are collectively referred to, they may be described as "manufacturing facility 30C", and when the log output devices 31C1 to 31Ck are collectively referred to, they may be described as "log output device 31C". Furthermore, when all the log output devices 31A, 31B, and 31C included in the manufacturing system 3 are collectively referred to, they may be described as "log output device 31".

The log output device 31 transmits log data to the server device 10. For example, the log output device 31 uploads the following log data to the server device 10, every time there is a start event in which a manufacturing process is started in a manufacturing facility 30 connected to the log output device 31 or an end event in which a manufacturing process is ended in the manufacturing facility 30. As an example, data in which items such as identification information of an individual body to which the manufacturing process is performed, event identification information identifying the start event or the end event, an event occurrence time, and identification information of the manufacturing facility 30 connected with the log output device 31 are associated with each other can be employed as the log data. The "individual body" referred to herein indicates a raw material or the like before being processed to be a product by the manufacturing process corresponding to each process.

In this manner, log data collected from the log output device 31 by the server device 10, which is so-called big data, is used for visualization of the production performance by the server device 10. A functional configuration of the server device 10 is specifically explained below.

[Server Device 10]

Figure 2:
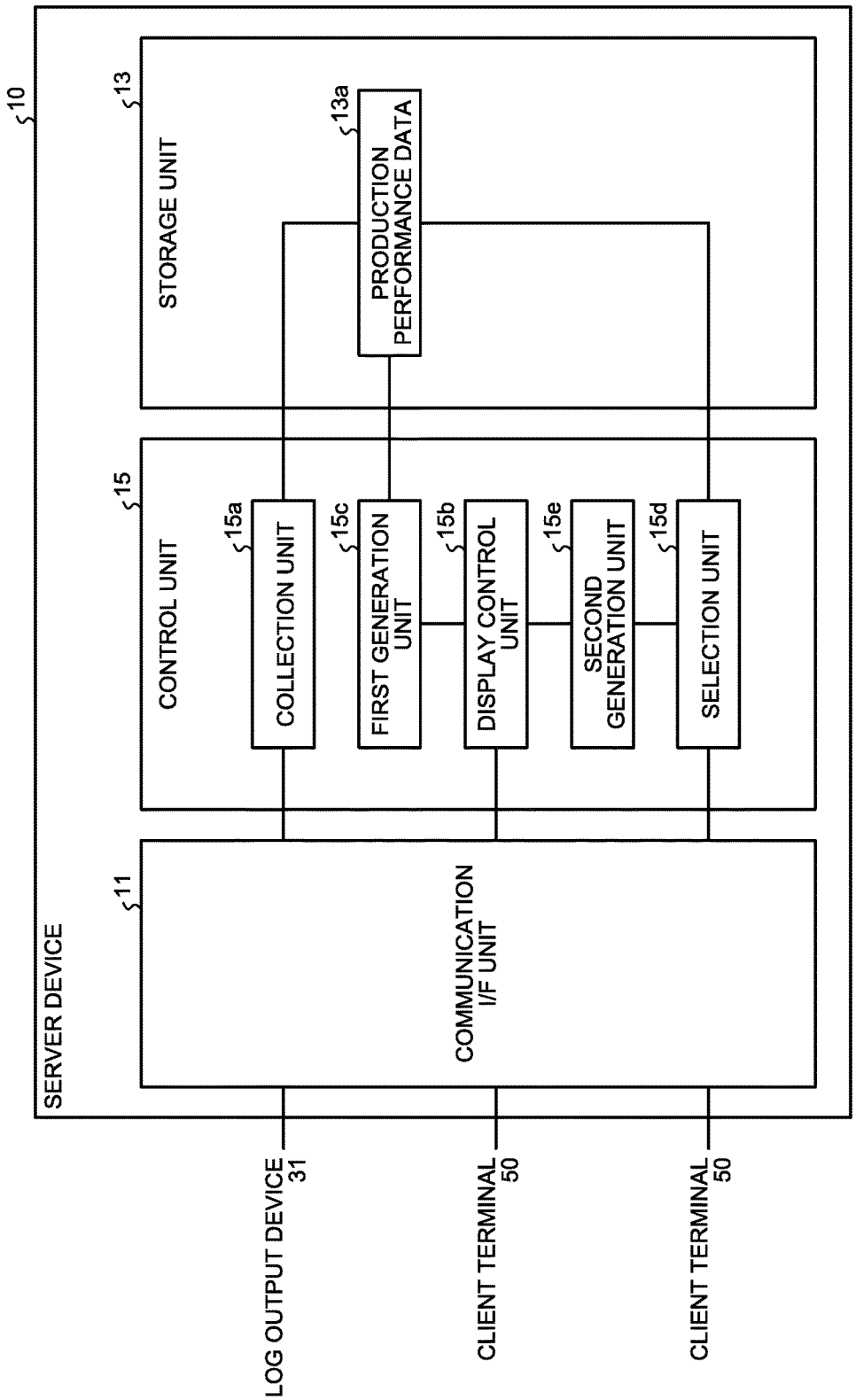
FIG. 2 is a block diagram illustrating a functional configuration of a server device according to the first embodiment.

FIG. 2 is a block diagram illustrating a functional configuration of the server device 10 according to the first embodiment. As illustrated in FIG. 2, the server device 10 includes a communication I/F unit 11, a storage unit 13, and a control unit 15. In FIG. 2, a solid line indicating an input/output relation of data is illustrated. However, this is illustrated only for a minimum portion for convenience sake of explanation. That is, input and output of data related to respective processing units are not limited to the illustrated example, and input and output of data other than the illustrated example, for example, between processing units, between a processing unit and data, and between a processing unit and an external device can be performed.

The communication I/F unit 11 is an interface that performs communication control between the server device 10 and other devices, such as between the server device 10 and the log output device 31, and between the server device 10 and the client terminal 50.

As one embodiment, a network interface card such as a LAN card can be employed as a mode of the communication I/F unit 11. For example, the communication I/F unit 11 can receive log data from the log output device 31. Further, the communication I/F unit 11 performs reception of a browsing request of a manufacturing report in which the production performance of the manufacturing system 3 is visualized and transmission of display data of the manufacturing report to the client terminal 50.

The storage unit 13 is a storage device that stores therein data used for various types of programs such as an application program that realizes the log-data analysis service described above, including an OS (Operating System) performed by the control unit 15.

As one embodiment, the storage unit 13 can be implemented as an auxiliary storage device in the server device 10. For example, an HDD (Hard Disk Drive), an optical disk, or an SSD (Solid State Drive) can be employed as the storage unit 13. The storage unit 13 does not always need to be implemented as the auxiliary storage device, and can be implemented as a main storage device in the server device 10. In this case, various semiconductor memory elements, for example, a RAM (Random Access Memory) and a flash memory can be employed as the storage unit 13.

The storage unit 13 stores therein production performance data 13a as an example of data to be used for a program executed by the control unit 15. Other than the production performance data 13a, other pieces of electronic data, for example, display setting data of a graph or a chart generated by the server device 10, drawing data of a product manufactured by the manufacturing system 3, and correspondence relation data of a product, LOT, and a temporary drawing number can be stored at the same time. The production performance data 13a is not static data stored beforehand, and thus the production performance data 13a is explained along with explanations of a processing unit that performs registration or referencing of respective data.

The control unit 15 includes an internal memory that stores therein various types of programs and control data and performs various types of processing by using these programs and control data.

As one embodiment, the control unit 15 is implemented as a central processing device, which is a so-called CPU (Central Processing Unit). The control unit 15 does not always need to be implemented as a central processing device and can be implemented as an MPU (Micro Processing Unit). The control unit 15 can be also realized by a hard-wired logic such as an ASIC (Application Specific Integrated Circuit) or an FPGA (Field Programmable Gate Array).

The control unit 15 virtually realizes the processing units described below by developing a display program stored in the storage unit 13 as an application program that realizes the log-data analysis service described above as a process on a work area of a RAM such as a DRAM (Dynamic Random Access Memory) or an SRAM (Static Random Access Memory) implemented as a main storage device (not illustrated).

For example, as illustrated in FIG. 2, the control unit 15 includes a collection unit 15a, a display control unit 15b, a first generation unit 15c, a selection unit 15d, and a second generation unit 15e.

The collection unit 15a is a processing unit that collects log data.

As one embodiment, the collection unit 15a performs processes described below, every time log data is uploaded from the log output device 31. That is, the collection unit 15a performs update of a record corresponding to the identification information of an individual body included in the log data, in the production performance data 13a in which items such as identification information of the manufacturing facility 30 that performs a manufacturing process corresponding to each process, the start time of the manufacturing process and the end time of the manufacturing process are associated with each other for each identification information of an individual body. For example, the collection unit 15a identifies a record having the identification information of the individual body included in the log data, in the records included in the production performance data 13a. Further, the collection unit 15a identifies a field of a process corresponding to the identification information of the manufacturing facility 30 included in the log data, among the fields of the process held by the record identified previously. Further, the collection unit 15a registers the time of event occurrence included in the log data in a field corresponding to the identification information of the event included in the log data, among the fields of the start time and the end time of the manufacturing process included in the fields of the process held by the record identified previously. For example, while in a case of the start event, a time is stored in a field of the start time, in a case of the end event, a time is stored in a field of the end time. In this manner, the collection unit 15a registers the start time or the end time of the manufacturing process and registers the identification information of the manufacturing facility 30 included in the log data in a field for storing the information of the manufacturing facility 30, included in the fields of the process identified previously. Due to this configuration, even when a plurality of manufacturing facilities 30 are included in one process, a computer can be caused to perform visualization of production performance in a state where the manufacturing facility 30 having performed the manufacturing process can be identified.

The display control unit 15b is a processing unit that executes display control with respect to the client terminal 50.

As one embodiment, upon reception of a browsing request of a manufacturing report from the client terminal 50, the display control unit 15b causes the client terminal 50 to display a manufacturing report screen including a timeline screen generated by the first generation unit 15c and an operating status screen generated by the second generation unit 15e. The "timeline" referred to herein indicates a line graph, for example, a sequential line graph charted by plotting the start time and the end time of the manufacturing process corresponding to each process on time axes arranged in parallel for respective segments of the start and end of the manufacturing process, according to a performing order of processes included in the manufacturing line, for each product flowing on the manufacturing line. The "operating status" indicates a graph obtained by charting a passage of time from the start to end of the manufacturing process for each of the manufacturing facilities 30 belonging to the process.

Between the "timeline" and the "operating status", the time axes thereof are displayed in a state of being arranged in the same direction. Therefore, when the respective time axes of the "timeline" are displayed in parallel in a vertical direction, the operating status screen is displayed on the left side or the right side of the timeline screen. When the respective time axes of the "timeline" are displayed in parallel in a horizontal direction, the operating status screen is displayed on the upper side or the lower side of the timeline screen. In the following descriptions, an area in which the timeline screen is displayed on the manufacturing report screen may be described as "first screen area", and an area in which the operating status screen is displayed may be described as "second screen area".

The first generation unit 15c is a processing unit that generates display data on a timeline screen.

As one embodiment, upon reception of a browsing request of a manufacturing report from the client terminal 50, the first generation unit 15c generates display data of the timeline screen described above. When the timeline screen is to be displayed, it is difficult to display timelines regarding all the products, because there is a limitation on the screen size that can be displayed by the display device of the client terminal 50. Therefore, there is described a case where products whose timelines are displayed are narrowed down by limiting a time length of the time axis displayed on the timeline screen to a certain period. As an example of the display range of a timeline, a case where a period of roughly an integral multiple of a lead time of a product is set is assumed here and explained below.

More specifically, the first generation unit 15c sets the display range of a timeline based on date and time when the browsing request of the manufacturing report is received, or date and time specified by a browsing request. Subsequently, the first generation unit 15c selects one record among the records of the production performance data 13a stored in the storage unit 13. One record of the production performance data 13a corresponds to one product, and thus selection of a record means selection of one individual body flowing in a manufacturing line. Subsequently, the first generation unit 15c determines whether any of the oldest start time of the start times of the manufacturing process or the latest end time of the end times of the manufacturing process included in the record selected previously is included in the display range of the timeline. When the oldest start time or the latest end time is included in the display range of the timeline, the first generation unit 15c saves the record in a work area of an internal memory (not illustrated), thereby extracting a product corresponding to the record. On the other hand, when any of the oldest start time and the latest end time is not included in the display range of the timeline, the record is not saved in the work area of the internal memory. The first generation unit 15c repeatedly performs extraction of the record until all the records in the production performance data 13a are selected.

Thereafter, when all the records in the production performance data 13a have been selected, the first generation unit 15c performs the following processing. That is, the first generation unit 15c plots the start time and the end time of the manufacturing process for each process included in the record on the respective time axes of the timeline for each record saved in the internal memory, and makes a sequential line graph by connecting the plotted points. Due to this operation, the display data on the timeline screen is generated.

The selection unit 15d is a processing unit that selects a process to be displayed on the operating status screen.

As one embodiment, the selection unit 15d can select a process from the respective processes included in a manufacturing line. For example, the selection unit 15d can select a process designated via a GUI component such as a text box or a pull-down menu. Further, by receiving designation of any area of areas separated by a plurality of time axes on the timeline screen, the selection unit 15d can select a process corresponding to the area for which selection has been received. For example, when a mouse is used as an example of a pointing device, designation of an area can be received by a mouseover operation or designation of an area in which a pointer position is included can be received by an operation of left click or right click. In addition, the selection unit 15d can automatically select a process instead of receiving selection of a process manually. For example, the selection unit 15d can automatically select a process in which there is the largest number of manufacturing facilities 30, among processes included in the manufacturing system 3 or can automatically select a process having the highest time cost or the highest monetary cost of the manufacturing process.

The second generation unit 15e is a processing unit that generates display data on an operating status screen.

As one embodiment, when a process is selected by the selection unit 15d, the second generation unit 15e performs the following processing. That is, the second generation unit 15e searches for a start time and an end time of a manufacturing process corresponding to the process selected by the selection unit 15d, among processes included in a record saved in the work area of the internal memory for each of the manufacturing facilities 30. The second generation unit 15e then calculates, for each manufacturing process, the degree of actual throughput, for example, a filling factor with respect to the maximum throughput that can be treated by the manufacturing facility 30 in one manufacturing process. The second generation unit 15e then generates a graph, for example, a histogram indicating a passage of time since the manufacturing process is started until the manufacturing process is ended, for each of the manufacturing facilities 30 belonging to the process selected previously. At this time, the second generation unit 15e can change the display mode of the histogram according to the magnitude of the filling factor in the manufacturing process corresponding to the histogram. Further, when a line segment of a sequential line graph is selected along with a process on the timeline screen, the second generation unit 15e performs highlight display by distinguishing a display mode of the histogram in which a manufacturing process of a product corresponding to the line segment is performed from a display mode of other histograms. As such a highlight display, not a narrowly defined highlight display, but a general highlight display in a broad sense can be applied. For example, fill of the histogram, highlighting by hatching, or highlighting by increasing the contrast of color or density can be made. Accordingly, the display data on the operating status screen is generated.

[First Specific Example of Manufacturing Report]

Figure 3:
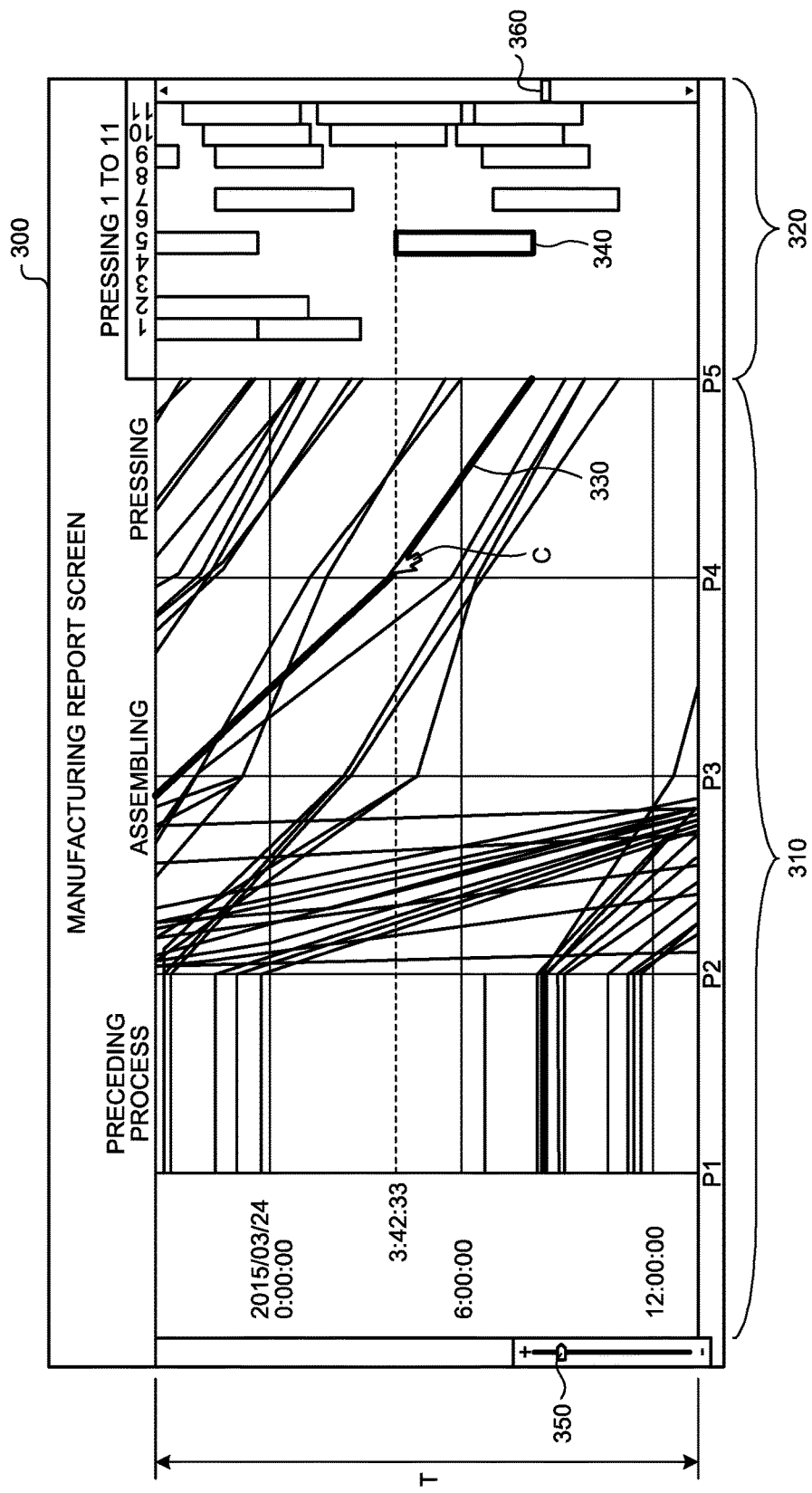
FIG. 3 is a diagram illustrating an example of a manufacturing report screen.

A display method of a manufacturing report according to the present embodiment is described next. FIG. 3 is a diagram illustrating an example of the manufacturing report screen. In FIG. 3, as an example of the manufacturing line, three processes "preceding process", "assembling", and "pressing" related to manufacturing of a printed circuit board are extracted and illustrated. The three processes illustrated in FIG. 3 are performed in order of the "preceding process" for performing surface treatment in which plating such as copper is applied to a plastic board, "assembling" for overlapping surface-treated plastic boards on each other between layers, and "pressing" for applying pressure and heat to the overlapped plastic boards, that is, in order from the left direction to the right direction. Among the three processes illustrated in FIG. 3, in the two processes of "preceding process" and "assembling", there is illustrated a case where logs of the start time, of the start time and the end time of the manufacturing process, are recorded, whereas in the "pressing", there is illustrated a case where both logs of the start time and the end time of the manufacturing process are recorded.

As illustrated in FIG. 3, a manufacturing report screen 300 includes a timeline screen 310 and an operating status screen 320. On the timeline screen 310 and the operating status screen 320, the time axes are shared, and a line segment representing a cross section of one hour, a broken line in FIG. 3, is displayed across the timeline screen 310 and the operating status screen 320 in a horizontal direction, based on a position at which a mouse cursor C is present. For example, on the timeline screen 310, time axes P1 to P5 are arranged in parallel for each of respective segments of the start and end of the manufacturing process. Among these time axes, the time axis P1 indicates a timing when a manufacturing process corresponding to the "preceding process" starts, and the time axis P2 indicates a timing when a manufacturing process corresponding to the "preceding process" ends. The time axis P3 indicates a timing when a manufacturing process corresponding to the "assembling" starts. The time axis 4 indicates a timing when a manufacturing process corresponding to the "pressing" starts, and a time axis 5 indicates a timing when a manufacturing process corresponding to the "pressing" ends. Further, a timeline regarding a record of a product in which one of the oldest start time or the latest end time of the records included in the production performance data 13a is included in a display range T of the timeline is displayed on the timeline screen 310.

In FIG. 3, such a state that a process to be displayed on the operating status screen 320 is selected by mouseover on the timeline screen 310 is assumed and described. As illustrated in FIG. 3, on the timeline screen 310, an area put between the time axis P1 and the time axis P2 as a boundary corresponds to the "preceding process", and an area put between the time axis P4 and the time axis P5 as a boundary corresponds to the process "pressing". Under the segments of areas, when mouseover of the mouse cursor C with respect to a sequential line graph 330 on the timeline screen 310 occurs in the area put between the time axis P4 and the time axis P5, the process "pressing" is selected as a process to be displayed on the operating status screen 320. In this case, the start time and the end time of the manufacturing process belonging to the process "pressing" are searched for each of the manufacturing facilities "1" to "11". A histogram indicating a passage of time since the manufacturing process starts until the manufacturing process ends is displayed on the operating status screen 320 for each of the manufacturing facilities 30 belonging to the process "pressing" selected previously. A line segment in the sequential line graph 330 is also selected on a stage when the process "pressing" is received on the timeline screen 310. Therefore, on the operating status screen 320, by distinguishing the display mode of a histogram 340 of the product corresponding to the line segment from a different display mode of other histograms, highlighting of the histogram 340 is realized.

By the display of an operating status, the relevant persons involved in the manufacturing system 3 can ascertain a biased operating status appearing in the manufacturing facilities belonging to the process being displayed. That is, a state where the manufacturing facilities "3" and "4" among the manufacturing facilities "1" to "11" are not operating in the display range of a timeline can be ascertained, and a state where the manufacturing facilities "9" to "11" are densely operating in the display range of the timeline can be ascertained. Therefore, influences of the operating status of the manufacturing facility on productivity can be visualized.

[Second Specific Example of Manufacturing Report]

Figure 4:
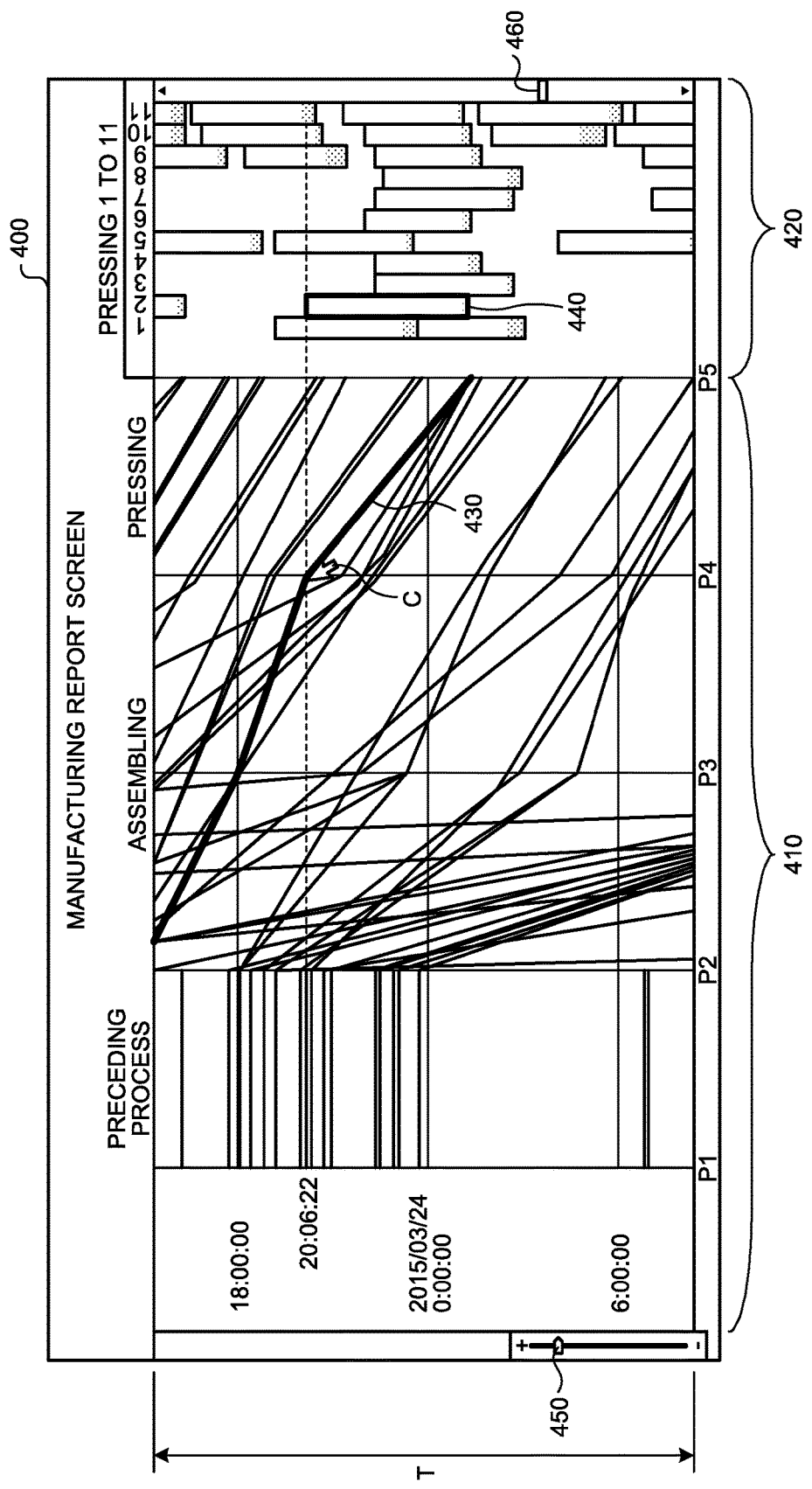
FIG. 4 is a diagram illustrating an example of the manufacturing report screen.
Figure 5:
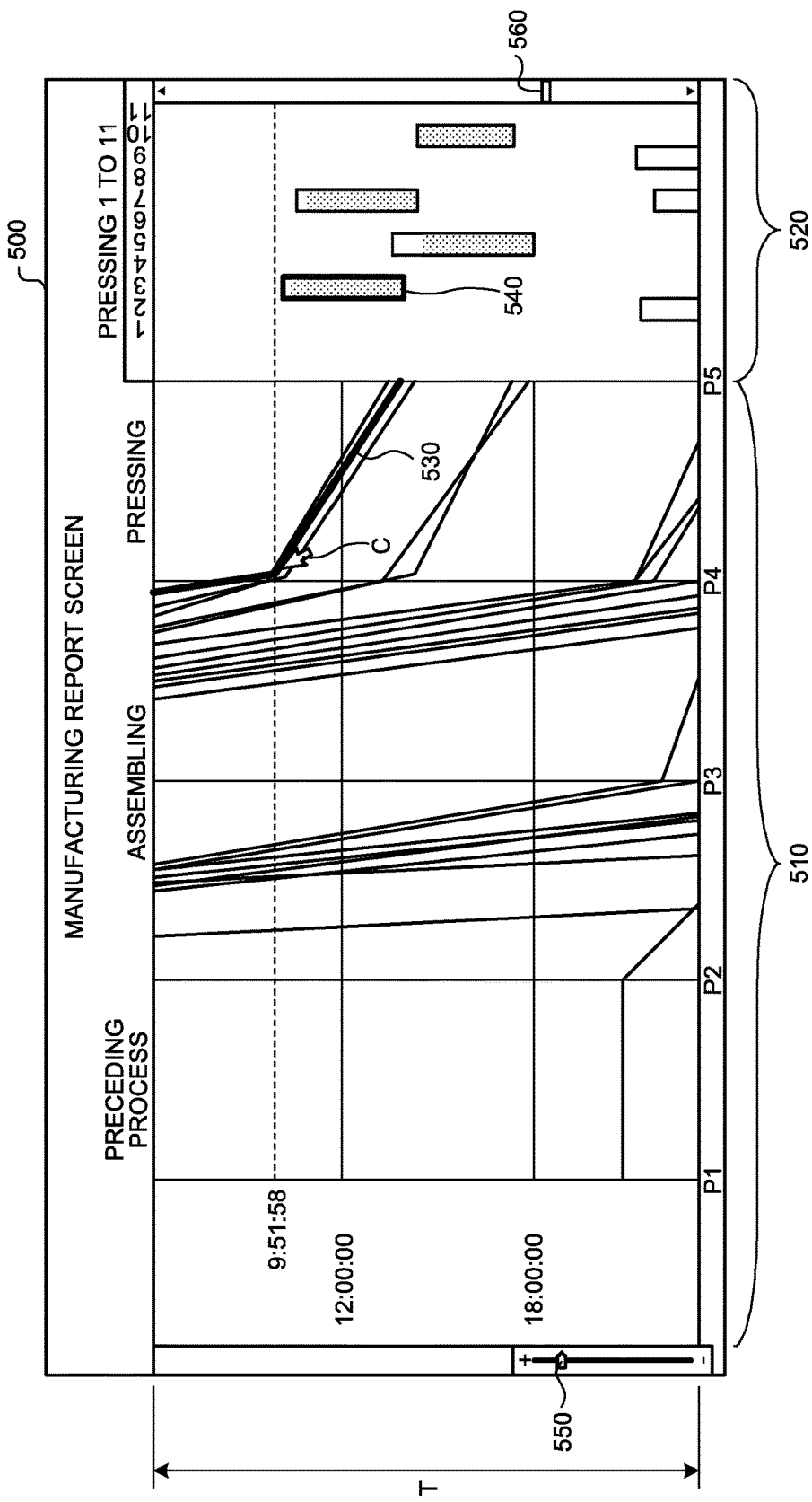
FIG. 5 is a diagram illustrating an example of the manufacturing report screen.

FIG. 4 and FIG. 5 are diagrams illustrating an example of the manufacturing report screen. In FIG. 4 and FIG. 5, as in the manufacturing report screen 300 illustrated in FIG. 3, three processes "preceding process", "assembling", and "pressing" related to manufacturing of a printed circuit board are extracted and illustrated, as an example of the manufacturing line. Also on a manufacturing report screens 400 and 500 illustrated in FIG. 4 and FIG. 5, an example in which mouseover is performed on a line segment in a sequential line graph 430 or 530 and on an area corresponding to the process "pressing" on a timeline screen 410 or 510 is illustrated as in the manufacturing report screen 300 illustrated in FIG. 3.

On an operating status screen 420 illustrated in FIG. 4 and an operating status screen 520 illustrated in FIG. 5, in addition to a highlighted histogram 440 or histogram 540, the degree of the number of actually filled plastic boards with respect to the maximum number of plastic boards that can be filled in one manufacturing process in the respective manufacturing facilities is displayed as a filling factor on each histogram. For example, such a display is performed that as the filling factor of the plastic boards increases, a hatched portion is increased from the bottom side of the histogram. For example, the histogram is hatched with the same rate as the filling factor. According to such a display of the filling factor, the load on the respective manufacturing facilities "1" to "11" in a process can be accurately estimated along with an operating status that can be ascertained from the histograms of the respective manufacturing facilities "1" to "11".

For example, in the case of the operating status screen 420 illustrated in FIG. 4, it is recognized that near 00:00:00 on 24 Mar. 2015, all the manufacturing facilities "1" to "11" are simultaneously operating, because the histograms are displayed in parallel for all the manufacturing facilities "1" to "11", while it is clearly recognized that the filling factor is low, because hatching is hardly seen in the respective histograms. In this manner, as a mere example, in the case where the filling factor is low although the operating rate of the manufacturing facilities "1" to "11" is high, the following indication can be obtained. For example, even when the operating rate of the manufacturing facilities "1" to "11" is high, it is possible to consider that it is more important to take measures to increase the filling factor by biasing plastic boards to a part of the manufacturing facilities without allocating the plastic boards equally to the respective manufacturing facilities, and investment in facilities is not necessary yet.

Meanwhile, in the case of the operating status screen 520 illustrated in FIG. 5, it is clearly recognized that although only four manufacturing facilities "3", "5", "7", and "10" are operating, the filling factor is high because the respective histograms are hatched nearly completely. In this manner, in the case where the filling factor is high although the operating rate of the manufacturing facilities "1" to "11" is low, it is recognized that the manufacturing plan of products is good, and products are manufactured efficiently.

[Change of Display Range]

The length of time of the display range T of a timeline can be changed by moving a slider 350, 450, or 550 illustrated in FIG. 3 to FIG. 5 on a slider bar. For example, when the slider 350, 450, or 550 is moved in a direction of "+", the length of time of the display range T of the timeline can be increased. When the slider 350, 450, or 550 is moved in a direction of "−", the length of time of the display range T of the timeline can be decreased.

[Process Flow]

Figure 6:
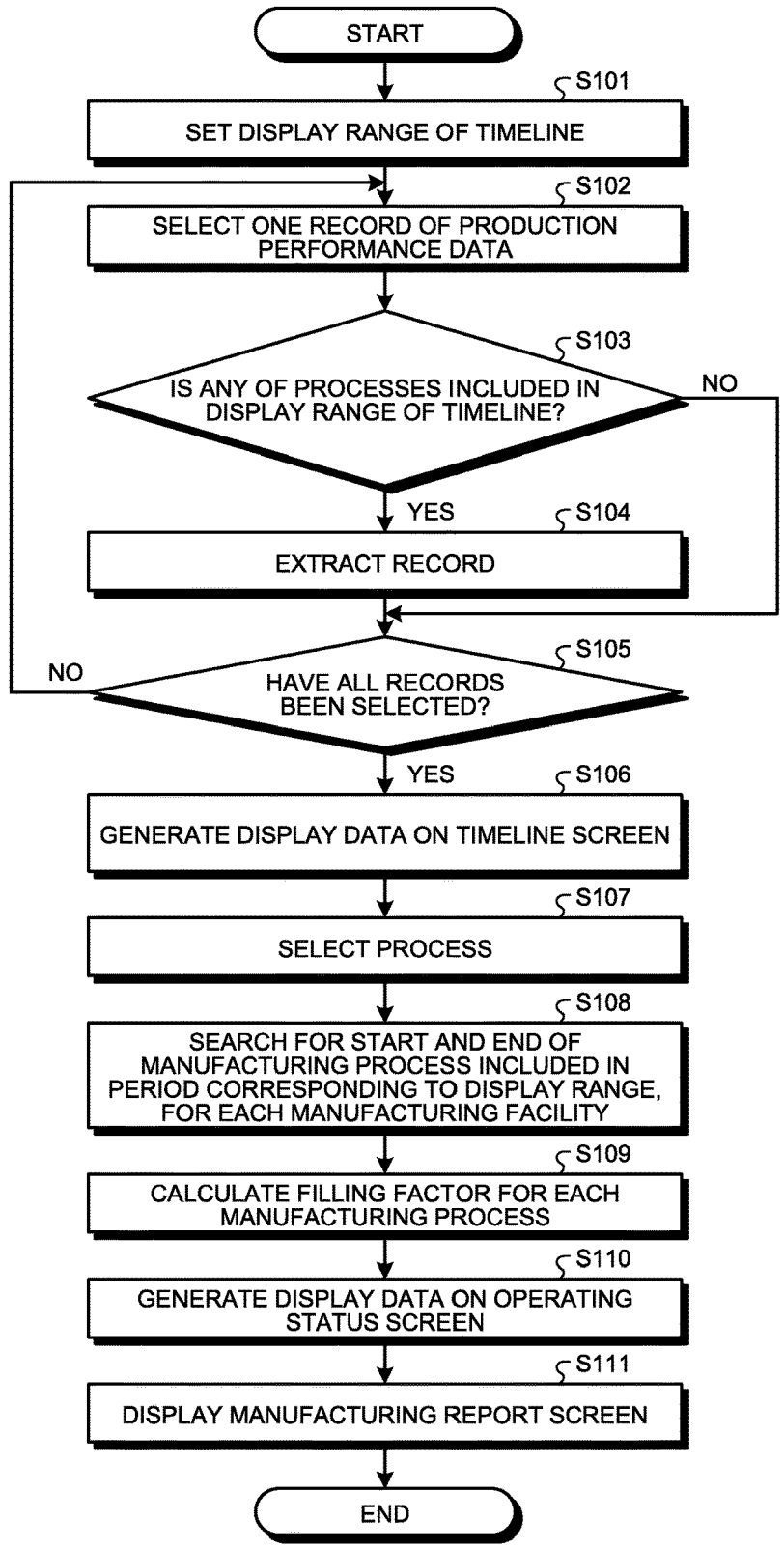
FIG. 6 is a flowchart illustrating a procedure of a display process according to the first embodiment.

FIG. 6 is a flowchart illustrating a procedure of a display process according to the first embodiment. As an example, this display process is started when a browsing request of a manufacturing report is received from the client terminal 50.

As illustrated in FIG. 6, the first generation unit 15c sets the display range of a timeline based on the date and time when a browsing request of a manufacturing report has been received or the date and time specified by the browsing request (Step S101). Subsequently, the first generation unit 15c selects one record among the records in the production performance data 13a stored in the storage unit 13 (Step S102).

Subsequently, the first generation unit 15c determines whether any of the oldest start time among the start times of the manufacturing process or the latest end time among the end times of the manufacturing process included in the record selected at Step S102 is included in the display range of the timeline (Step S103).

When the oldest start time or the latest end time is included in the display range of the timeline (YES at Step S103), the first generation unit 15c saves the record in a work area of an internal memory (not illustrated), thereby extracting a product corresponding to the record (Step S104). Meanwhile, when the oldest start time or the latest end time is not included in the display range of the timeline (NO at Step S103), the record is not saved in the work area of the internal memory, and the processing proceeds to the process at Step S105.

The first generation unit 15c then repeatedly performs the process at Step S102 to Step S104 described above until all the records in the production performance data 13a are selected (NO at Step S105). Thereafter, when all the records in the production performance data 13a have been selected (YES at Step S105), the following processing is performed.

That is, the first generation unit 15c plots the start time and the end time of the manufacturing process per process included in the record on the respective time axes of the timeline, for each record saved in the internal memory, and makes a sequential line graph by connecting the plotted points, thereby generating display data on a timeline screen (Step S106).

Subsequently, the selection unit 15d selects a process to be displayed on the operating status screen (Step S107). The second generation unit 15e then searches for the start time and the end time of the manufacturing process corresponding to the process selected at Step S107, among the processes included in the record saved in the work area of the internal memory, for each of the manufacturing facilities 30 (Step S108).

Thereafter, the second generation unit 15e calculates the degree of the actual throughput, for example, a filling factor with respect to the maximum throughput that can be treated by a manufacturing facility in one manufacturing process, for each manufacturing process (Step S109). The second generation unit 15e then generates a histogram indicating a passage of time since the manufacturing process starts until the manufacturing process ends for each of the manufacturing facilities 30 belonging to the process selected previously and generates display data on the operating status screen by changing a display mode of the histogram according to the magnitude of the filling factor by the manufacturing process corresponding to the respective histograms (Step S110).

Lastly, the display control unit 15b causes the display data on the timeline screen generated at Step S106 to be displayed in the first screen area, and causes the display data on the operating status screen generated at Step S110 to be displayed in the second screen area (Step S111), and the process is ended.

[One Aspect of Effects]

As described above, the server device 10 according to the present embodiment displays in parallel a timeline of a product in which the passage of time from the start to end for each of processes included in a manufacturing line is arranged in order of execution of the processes and a graph in which operating statuses indicating the passage of time from the start to end of a manufacturing process in a process are arranged for each of manufacturing facilities, with the time axes being aligned. Therefore, according to the server device 10 of the present embodiment, influences of the operating status of manufacturing facilities on productivity can be visualized.

Second Embodiment

While an embodiment related to the disclosed device has been described above, other than the above embodiment, the present invention can be also carried out in variously different modes. Other embodiments included in the present invention are described below.

[Application Example of Filling Factor (Load Factor)]

In the first embodiment described above, there has been exemplified a case where a filling factor is expressed by synchronizing a rate of a hatched area of a histogram with the filling factor. However, when the passage of time in a manufacturing process, that is, when the height is different between respective histograms, the size of the hatched area varies even in the case of the same filling factor. Therefore, the server device 10 can realize a display described below so that the filling factor can be ascertained relatively between the respective histograms, even if the passage of time in the manufacturing process is different between the respective histograms.

Figure 7:
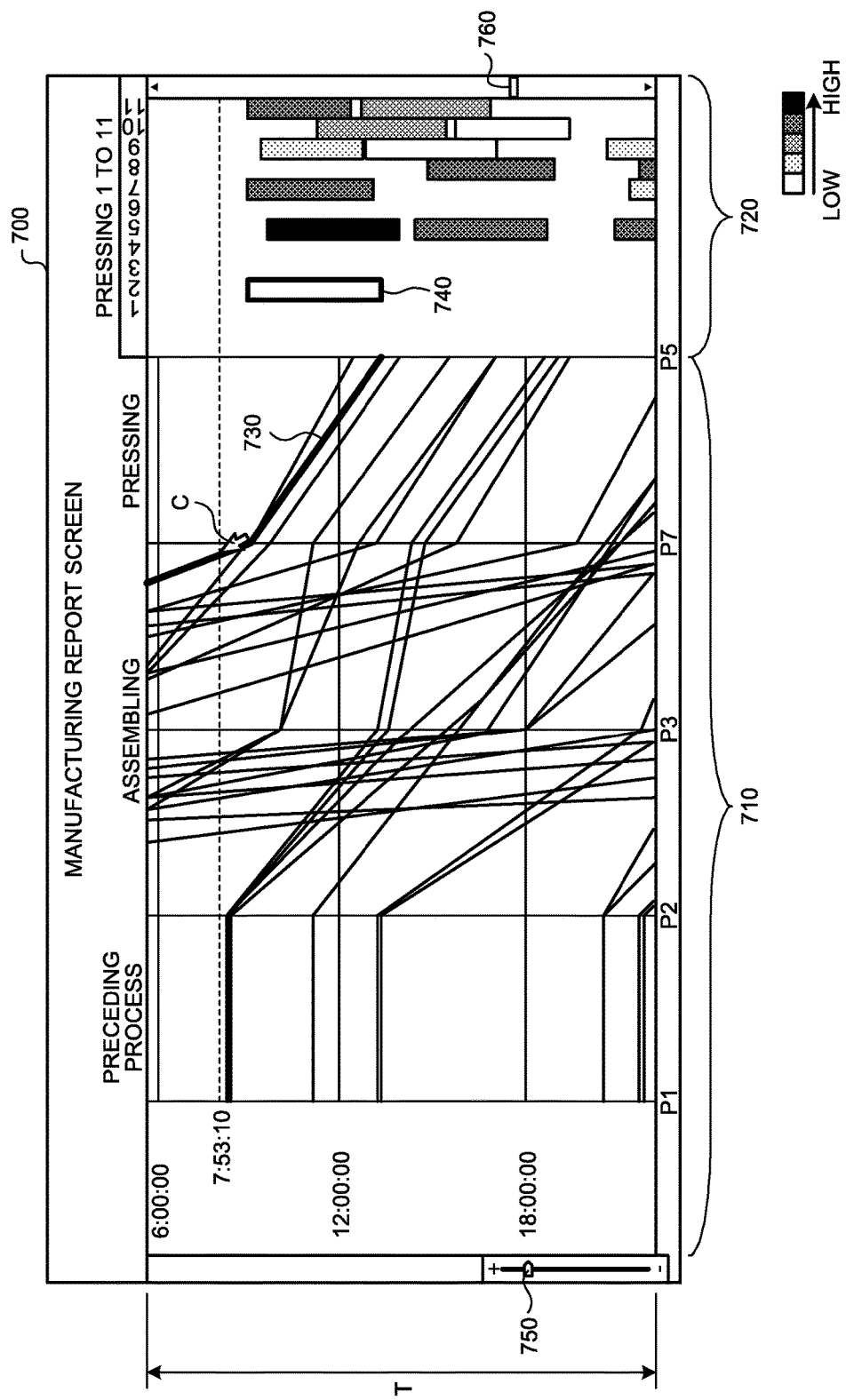
FIG. 7 is a diagram illustrating an example of the manufacturing report screen.

FIG. 7 is a diagram illustrating an example of the manufacturing report screen. In FIG. 7, as in the manufacturing report screen 300 illustrated in FIG. 3, three processes "preceding process", "assembling", and "pressing" related to manufacturing of a printed circuit board are extracted and illustrated, as an example of a manufacturing line. Also on the manufacturing report screen 700 illustrated in FIG. 7, an example in which mouseover is performed on a line segment in a sequential line graph 730 and on an area corresponding to the process "pressing" on a timeline screen 710 is illustrated, as in the manufacturing report screen 300 illustrated in FIG. 3.

On an operating status screen 720 illustrated in FIG. 7, in addition to a highlighted histogram 740, the degree of the number of actually filled plastic boards with respect to the maximum number of plastic boards that can be filled in one manufacturing process in respective manufacturing facilities is displayed as a filling factor on each histogram. On the operating status screen 720 illustrated in FIG. 7, the filling factor is expressed by fill of a heat map of the histogram. That is, in the example of the operating status screen 720 illustrated in FIG. 7, as the filling factor decreases, the fill of the histogram approaches to "white", and as the filling factor increases, the fill of the histogram approaches to "black". Accordingly, even if the passage of time in the manufacturing process is different between the respective histograms, the filling factor can be easily ascertained relatively between the respective histograms.

While a case where the magnitude of a filling factor is distinguished by contrasting the density of black and white has been exemplified here, the magnitude of the filling factor can be distinguished by color. Further, distinguishing by color and distinguishing by contrasting density can be used together. For example, the same color is allocated to products of the same type, and a different color is allocated to products of a different type. In addition, the magnitude of the filling factor can be distinguished by contrasting density. Further, because the width in the horizontal direction of the histogram is constant regardless of the passage of time in the manufacturing process, a hatched area can be changed according to the magnitude of the filling factor in the horizontal direction, instead of that in the vertical direction.

[Shift of Display Range]

For example, the server device 10 can shift the display range of a timeline manually or automatically. For example, by moving a scroll bar 360, 460, or 560 illustrated in FIG. 3 to FIG. 5, the display range of the timeline can be shifted in a chronological direction of time. For example, when the scroll bar 360, 460, or 560 is moved upward, the display range can be shifted in a direction moving back in time, while maintaining the length of time of the display range of the timeline. Further, when the scroll bar 360, 460, or 560 is moved downward, the display range can be shifted in a direction of passage of time, while maintaining the length of time of the display range of the timeline. The display range of the timeline can be automatically shifted through a GUI component that switches the mode to an animation mode or the like. Every time the display range of the timeline is shifted in this manner, the display is updated on a manufacturing route screen from a manufacturing route related to each product included in the display range T of the timeline before the shift to a manufacturing route related to each product included in the display range T+1 of the timeline after the shift.

[Separation and Integration]

The respective constituent elements of the respective devices illustrated in the drawings do not always need to be physically configured as illustrated. That is, the specific modes of separation and integration of the respective devices are not limited to those illustrated in the drawings, and a part or all of these devices can be configured in a functionally or physically separated or integrated manner in an arbitrary unit in accordance with various types of loads and the status of use. For example, the collection unit 15a, the display control unit 15b, the first generation unit 15c, the selection unit 15d, or the second generation unit 15e can be connected to the server device 10 as an external device thereof via a network. Further, the collection unit 15a, the display control unit 15b, the first generation unit 15c, the selection unit 15d, or the second generation unit 15e can be provided in other devices respectively and connected to each other via the network to cooperate with each other, thereby realizing the functions of the server device 10 described above.

[Display Program]

The various types of processes described in the above embodiment can be realized by executing a program prepared in advance by a computer such as a personal computer or a workstation. In the following descriptions, an example of a computer that executes a display program having the functions identical to those of the embodiment described above is explained with reference to FIG. 8.

Figure 8:
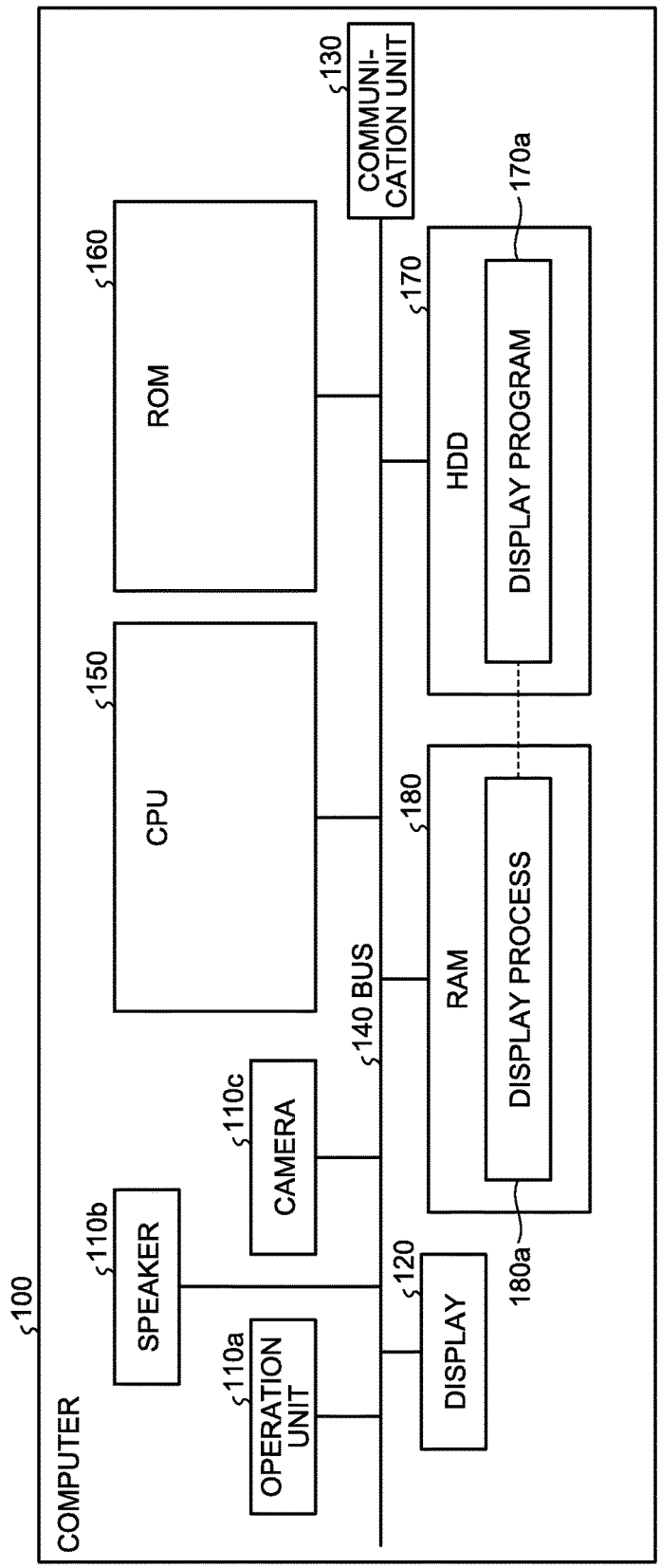
FIG. 8 is a diagram illustrating a hardware configuration example of a computer that executes a display program according to the first embodiment and a second embodiment.

FIG. 8 is a diagram illustrating a hardware configuration example of a computer that executes the display program according to the first embodiment and a second embodiment. As illustrated in FIG. 8, a computer 100 includes an operation unit 110a, a speaker 110b, a camera 110c, a display 120, and a communication unit 130. The computer 100 also includes a CPU 150, a ROM 160, an HDD 170, and a RAM 180. The respective units 110 to 180 are connected to each other via a bus 140.

As illustrated in FIG. 8, the HDD 170 stores therein a display program 170a that exerts functions identical to those of the collection unit 15a, the display control unit 15b, the first generation unit 15c, the selection unit 15d, and the second generation unit 15e explained in the first embodiment described above. The display program 170a can be integrated or separated as in the respective constituent elements of the collection unit 15a, the display control unit 15b, the first generation unit 15c, the selection unit 15d, and the second generation unit 15e illustrated in FIG. 2. That is, all the pieces of data explained in the first embodiment described above do not always need to be stored in the HDD 170, and it suffices that only the data to be used for the processing is stored in the HDD 170.

Under such an environment, the CPU 150 reads out the display program 170a from the HDD 170 and develops the program on the RAM 180. As a result, the display program 170a functions as a display process 180a as illustrated in FIG. 8. The display process 180a develops various pieces of data read out from the HDD 170 in an area allocated to the display process 180a, in a storage area of the RAM 180, so as to perform various types of processing by using the developed various pieces of data. For example, as an example of processing performed by the display process 180a, the processing illustrated in FIG. 6 is included. In the CPU 150, all the processing units explained in the first embodiment described above do not always need to be operated, and it suffices that only the processing unit corresponding to the processing to be performed is realized virtually.

The display program 170a described above do not always need to be stored in advance in the HDD 170 and the ROM 160. For example, respective programs are stored in "portable physical mediums" such as a flexible disk, a so-called FD, a CD-ROM, a DVD, a magneto-optical disk, and an IC card. It is possible to configure that the computer 100 then acquires respective programs from such portable physical mediums and executes these programs. It is also possible to configure that respective programs are stored in other computers or server devices that are connected to the computer 100 via a public communication line, the Internet, a LAN, a WAN, and the like, and the computer 100 acquires and executes these programs.

It is possible to visualize influences of the operating status of a manufacturing facility on productivity.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display method of information indicating an operating status of a manufacturing system that includes a plurality of processes to be performed sequentially to manufacture one product and includes one or more manufacturing facilities that perform a manufacturing process in each of the processes, the display method comprising:

displaying, in a first screen area, a line segment indicating a passage of time from start to end of a manufacturing process in each of the processes, with time axes being aligned in a same direction between the processes, based on information of a start time and an end time of a manufacturing process for one product in each of the processes, in a state being segmented for each process in order of execution of the process, for each of one or more products manufactured by the manufacturing system, by a processor; and displaying, in a second screen area, a graph indicating a passage of time from start to end of a manufacturing process, with time axes being aligned in a same direction as time axes in the first screen area, based on information of a start time and an end time of a manufacturing process in one or more manufacturing facilities included in a selected first process among the processes, for each of the manufacturing facilities in the first process, by the processor.

2. The display method according to claim 1, wherein the first screen area and the second screen area are displayed side-by-side;

specification of time in the first screen area or the second screen area is received; and a line segment spanning over the first screen area and the second screen area corresponding to the received time is displayed.

3. A display method of information indicating an operating status of a manufacturing system, in the manufacturing system in which a manufacturing process for manufacturing one product includes one or more manufacturing facilities that perform a manufacturing process, the display method comprising:

generating, by a processor, first display information including information indicating a passage of time for each passage of time from start to end of a manufacturing process and information indicating a load on the manufacturing process in the passage of time, for each of the manufacturing facilities, based on information of a start time and an end time of a manufacturing process in one or more manufacturing facilities included in the manufacturing process, and displaying, by the processor, the first display information.

4. The display method according to claim 3, wherein the manufacturing process includes a plurality of processes to be performed sequentially to manufacture the one product, and the generating includes receiving selection with respect to any process among the plurality of processes, and includes generating the first display information related to a first process for which the selection has been received.

5. The display method according to claim 3, wherein information indicating the load indicates a degree of actual throughput with respect to maximum throughput that can be treated by one manufacturing process.

6. A display method of information indicating an operating status of a manufacturing system, in the manufacturing system that includes a plurality of processes to be performed sequentially to manufacture one product and includes one or more manufacturing facilities that perform a manufacturing process in each of the processes, the display method comprising:

displaying, in a first screen area, a line segment indicating a passage of time from start to end of a manufacturing process in each of the processes, with time axes being aligned in a same direction between the respective processes, based on information of a start time and an end time of a manufacturing process for one product in each of the processes, in a state being segmented for each process in order of execution of the process, for each of one or more products manufactured by the manufacturing system, by a processor;

receiving, by the processor, selection of any line segment among line segments displayed in the first screen area; and displaying, by the processor, a graph corresponding to a first manufacturing facility identified by a first line segment for which selection has been received in a state of being able to be distinguished from graphs corresponding to other manufacturing facilities, in a second screen area in which a graph indicating a passage of time from start to end of a manufacturing process is displayed in a state with time axes being aligned in a same direction as the time axes in the first screen area, based on information of a start time and an end time of a manufacturing process in one or more manufacturing facilities included in a first process that is identified by the first line segment for which selection has been received, for each of the manufacturing facilities in the first process.

7. The display method according to claim 6, wherein the graph is a line segment connecting a point corresponding to a start time of a manufacturing process and a point corresponding to an end time thereof.

8. A display method of information indicating an operating status of a manufacturing system, in the manufacturing system that includes a plurality of processes to be performed sequentially to manufacture one product and includes one or more manufacturing facilities that perform a manufacturing process in each of the processes, the displaying method comprising:

displaying, in a first screen area, a line segment indicating a passage of time from start to end of a manufacturing process in each of the processes, with time axes being aligned in a same direction between the respective processes, based on information of a start time and an end time of a manufacturing process for one product in each of the processes, in a state being segmented for each process in order of execution of the process, for each of one or more products manufactured by the manufacturing system, by a processor;

receiving, by the processor, selection of an area corresponding to any process in the first screen area; and displaying, in a second screen area, a graph indicating a passage of time from start to end of a manufacturing process, with time axes being aligned in a same direction as time axes in the first screen area, based on information of a start time and an end time of a manufacturing process in one or more manufacturing facilities included in a first process that is identified by a selected area, for each of the manufacturing facilities in the first process, by the processor.

* * * * *